United States Patent [19]
Nomoto

[11] Patent Number: 5,689,479
[45] Date of Patent: Nov. 18, 1997

[54] MAGNETO-OPTICAL RECORDING APPARATUS

[75] Inventor: Tadaaki Nomoto, Tokyo, Japan

[73] Assignee: Sony Corporation, Tokyo, Japan

[21] Appl. No.: 719,183

[22] Filed: Sep. 24, 1996

[30] Foreign Application Priority Data

Sep. 25, 1995 [JP] Japan .................. 7-270541

[51] Int. Cl.$^6$ .................. G11B 11/00
[52] U.S. Cl. .................. 369/13; 360/114
[58] Field of Search .................. 369/13, 14, 110, 369/116, 54, 58; 300/59, 114; 365/122

[56] References Cited

U.S. PATENT DOCUMENTS

| | | | |
|---|---|---|---|
| 4,712,203 | 12/1987 | Saito et al. | 369/13 |
| 4,907,211 | 3/1990 | Horimai | 369/13 |
| 5,587,975 | 12/1996 | Kobayashi | 369/13 |
| 5,629,912 | 5/1997 | Okawa et al. | 369/44.29 |

FOREIGN PATENT DOCUMENTS

61-950 1/1986 Japan.

Primary Examiner—Tan Dinh
Attorney, Agent, or Firm—Limbach & Limbach L.L.P.

[57] ABSTRACT

In a magneto-optical recording apparatus, since a magnetic field is not generated in a data recording impossible area in order to lower power consumption, sufficient intensity of the magnetic field can be obtained at the head of a data recording area. In the case of recording information data in a data recording area of a magneto-optical recording medium, a magnetic field is generated in a data recording impossible area which exists between a pit formed at the latest end side of the data recording impossible area and the head of a data recording area located just after the data recording impossible area, without generating the magnetic field during the time of scanning a laser beam from the head of a data impossible area located just before a data recording area and a pit formed at the latest end side of the data recording impossible area. Thereby practically sufficient intensity of the magnetic field can be steadily and surely obtained at the time of recording information data in the data recording area. Thus a magneto-optical recording apparatus and a magneto-optical recording method which is able to cope with to high-density recording with low power consumption can be realized.

6 Claims, 10 Drawing Sheets

MAGNETO-OPTICAL RECORDING APPARATUS

BACKGROUND OF THE INVENTION

1. Field of the Invention

This invention relates to a magneto-optical recording apparatus, and more particularly, is suitably applied to a magneto-optical recording apparatus for recording data in a magneto-optical recording medium on a magnetic field modulation system.

2. Description of the Related Art

Heretofore, in this type of a magneto-optical recording apparatus of magnetic field modulation system, while a laser beam is emitted on one surface of the magneto-optical disc, data is recorded by applying a magnetic field modulated by information data to an area which corresponds to a data recording area of a magnetic film, formed on the other surface of the magneto-optical disc. And the data is reproduced by detecting the direction of the polarization rotation, against a light emitted from the laser beam source, of the reflected light which is obtained by irradiating the emitted light on a recording film, and is linearly polarized.

In the magneto-optical recording apparatus of a magnetic field modulation system, a magnetic head which moves in synchronization with the position of a laser spot is placed on a side opposite to a pickup, in such a manner that the magneto-optical disc is put between them. The direction of the magnetic field is changed by changing the direction of the current which flows through the magnetic head.

In such a magneto-optical recording apparatus of magnetic field modulation system, it is necessary to modulate the magnetic field generated on the magnetic head at high speed, as the recording density to the disc become higher, so the various magnetic head driving circuits have been developed. Such magnetic head driving circuits are arranged so as to perform high-speed modulation of the magnetic field with a frequency which is higher than that determined by the time constant based on the inductance of the magnetic head.

This type of magnetic head driving circuit comprises: a first auxiliary coil and a second auxiliary coil respectively connected to one end and the other end of the magnetic head; a first switch connected to one end of the magnetic head and one end of the first auxiliary coil; a second switch connected to the other end of the magnetic head and one end of the second auxiliary coil; and a constant-current source connected to the other ends of the first and the second auxiliary coils.

In the magnetic head driving circuit, when the first switch is set ON and the second switch is set OFF on the basis of recording data to be input, the current flows through the magnetic head, from the other end side of the magnetic head to one end side of the magnetic head (hereinafter, referred to as first direction), through the second auxiliary coil. After that, when the first switch is turned OFF and the second switch is turned ON with a certain timing, the current flows through the magnetic field, from one end side of the magnetic head to the other end side of the magnetic head (hereinafter, referred to as second direction), through the first auxiliary coil. At this time, in the magnetic head driving circuit, the current direction which flows through the magnetic head can be turned by energy which has been stored in the first auxiliary coil with a speed which is faster than that determined by the time constant of the magnetic head, thus high-speed modulation can be performed.

By the way, as aforesaid above, energy must be stored in the auxiliary coils to perform high-speed modulation; and the current which flows through the magnetic head just after setting either the first switch or the second switch ON depends on the time constant of the inductance of the magnetic head driving circuit.

Though large inductance of the magnetic head is preferable to obtain sufficient intensity of the magnetic field at the time of recording data, large inductance of the magnetic head brings large time constant which is determined by the inductance of the magnetic head inevitably, therefore necessary intensity of the magnetic field can not be obtained at the time of recording data just after the start of driving the magnetic head.

Figure 1:
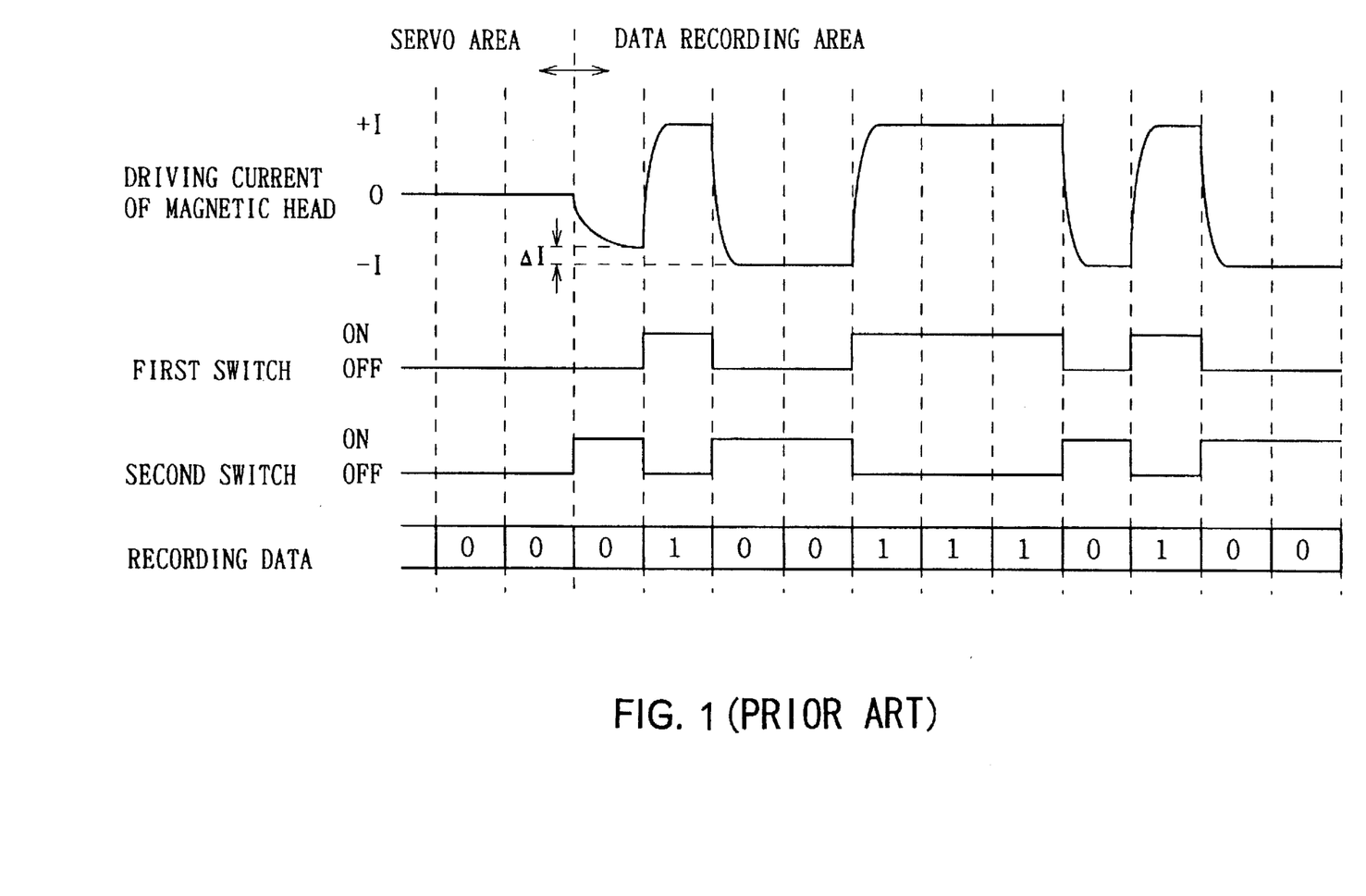
FIG. 1 is a timing chart explaining the conventional timing for generating the magnetic field.

That is, as shown in FIG. 1, in the case where the current flows through the magnetic head in the second direction when the recording data is "0", i.e., a logical "L" level, and current of this time is designated as "-I", if the magnetic field is generated concurrently with starting to record the data, the second switch is set ON, and at the same time the current "-I" corresponding to the recording data "0" flows through the magnetic head. The rising of the current waveform of this moment is determined by the time constant based on the inductance of the magnetic head driving circuit.

After that, when the first switch is turned ON and the second switch is turned OFF in accordance with the recording data "1", i.e., a logical "H" level, a current "+I" flows through the magnetic head. The current wave-form of this moment rises with a speed which is faster than that determined by the time constant based on the inductance of the magnetic head driving circuit, because the energy have been stored in the second auxiliary coil. Therefore, since the magnetic field corresponding to the head part of the data recording area becomes smaller by a ΔI comparing to that corresponding to the other data, necessary intensity of the magnetic field can not be obtained at the time of recording recording data. So that, there have been such problems that the recording data can not be steadily and certainly recorded in the head of the data recording area, as a result, it is not able to cope with high-density recording.

In this case, especially in magnetic-field modulation magneto-optical recording employed a sample servo, the magnetic field is not generated in a servo area where servo information have been recorded and in an address area where track information have been recorded in order to reduce the power consumption, therefore sufficient intensity of the magnetic field can not be obtained at the head part of each data recording area. As a result, the recording data can not be steadily and certainly recorded, and it is not able to cope with high-density recording.

SUMMARY OF THE INVENTION

In view of the foregoing, an object of this invention is to provide a magneto-optical recording apparatus which is able to cope with high-density recording with low power consumption.

The foregoing object and other objects of the invention have been achieved by the provision of a magneto-optical recording apparatus in which in the case where information data is recorded in a data recording area of the magneto-optical recording medium, the magnetic field is not generated while a laser beam goes through from the head of a data recording impossible area located just before a data recording area to a pit formed at the latest end side of the data recording impossible area, but the magnetic field is generated in a data recording impossible area which is positioned between a pit formed at the latest end side of the data recording impossible area and the head of the data recording area located just after the data recording impossible area, and in the data recording area, the magnetic field modulated based on the information data is generated.

The magnetic field is generated in the data recording impossible area which exists between the pit formed at the latest end side of the data recording impossible area and the head of the data recording area located just after the data recording impossible area, so that practical sufficient intensity of the magnetic field can be obtained at the time of recording the information data in the data recording area.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawing:

FIGS. 7A to 7G are timing charts explaining the timing for generating the magnetic field according to the embodiment;

FIGS. 9A to 9G and 10A to 10G are timing charts explaining the timing for generating the magnetic field according to the other embodiment.

DETAILED DESCRIPTION OF THE EMBODIMENT

Figure 2:
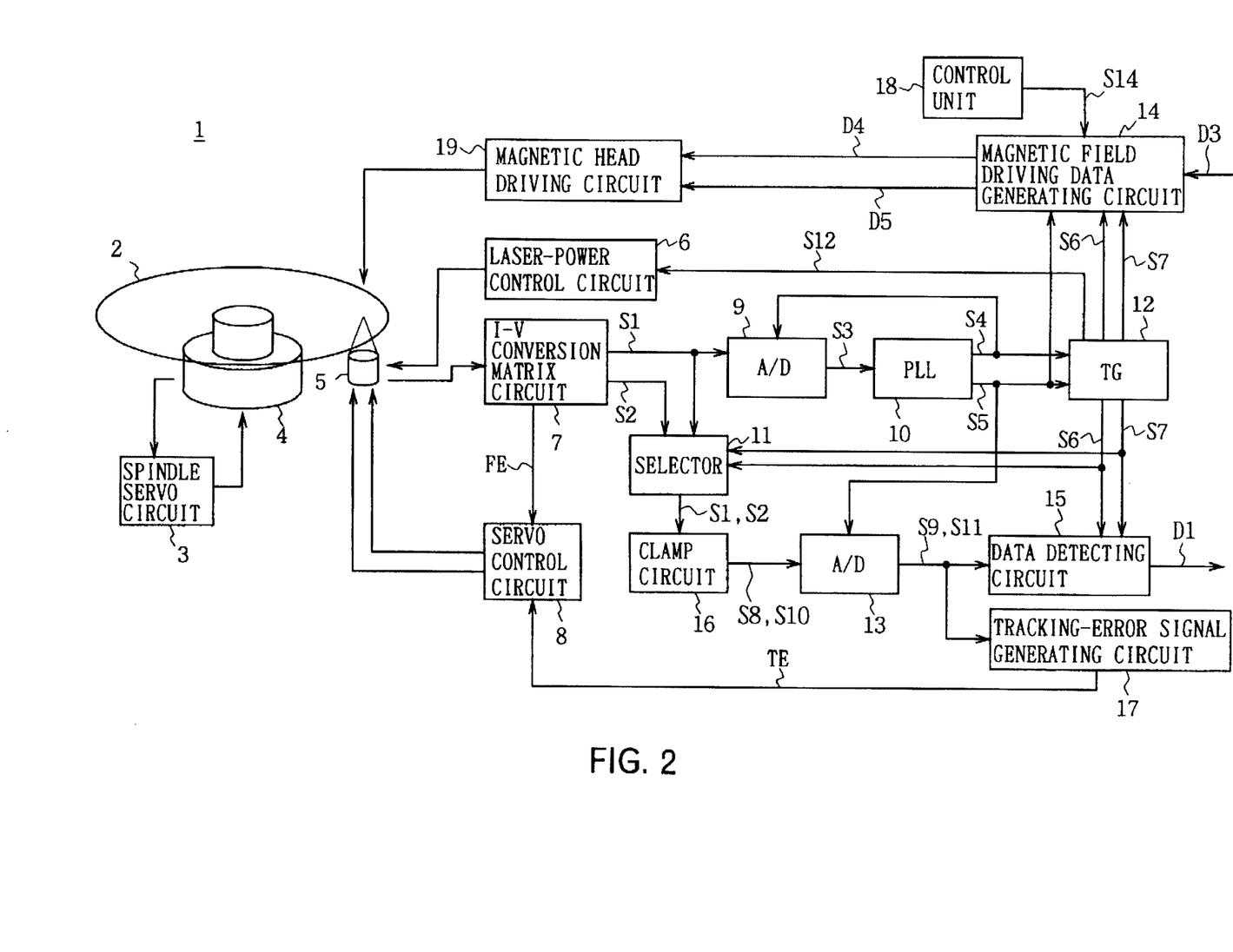
FIG. 2 is a block diagram showing an embodiment of a magneto-optical recording apparatus according to the present invention.

Preferred embodiments of this invention will be described with reference to the accompanying drawings:

In FIG. 2, 1 shows a magneto-optical recording/reproducing apparatus of magnetic field modulation system according to the present invention as a whole. The magneto-optical recording/reproducing apparatus 1 is composed so that data is recorded by using a sample servo system and a zone constant angular velocity (CAV) system. At this point, the zone CAV system is a recording/reproducing system in which data transmission speed of the outer periphery of a disc is faster than that of the inner periphery so that linear density of the inner periphery is the same as as that of the outer periphery.

Figure 3:
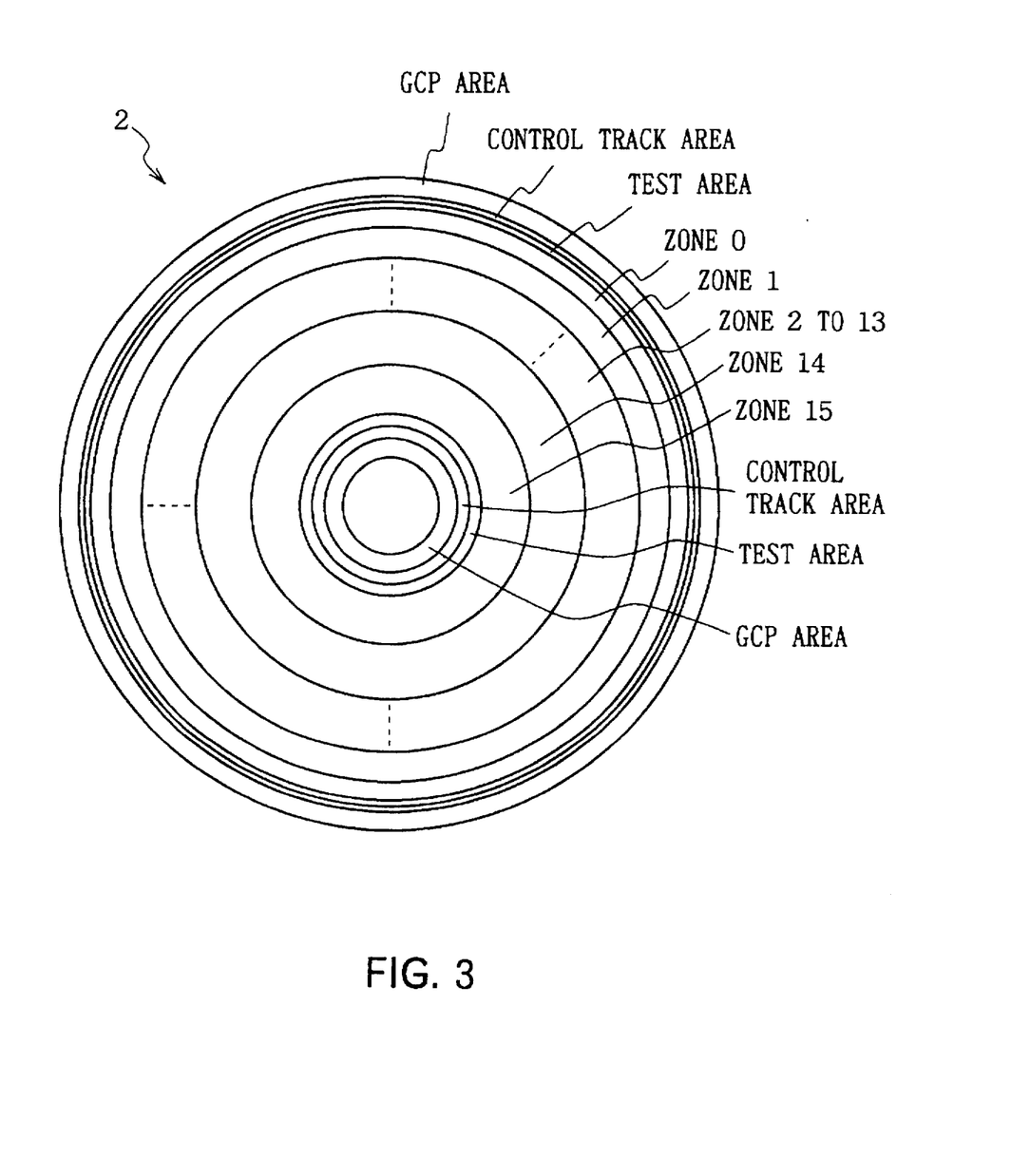
FIGS. 3, 4 and 5 are schematic diagrams showing the format of the magneto-optical disc.

As shown in FIG. 3, an magneto-optical disc 2 used in the magneto-optical recording/reproducing apparatus 1 is a zone CAV disc, and has a gray cods part (GCP) area, a buffer area (not shown), a control track area, a buffer area (not shown), a test area, plural user zones 0 to 15, a test area, a buffer area (not shown), a control track area, a buffer area (not shown), and a GCP area, successively from the outer periphery.

Figure 4:
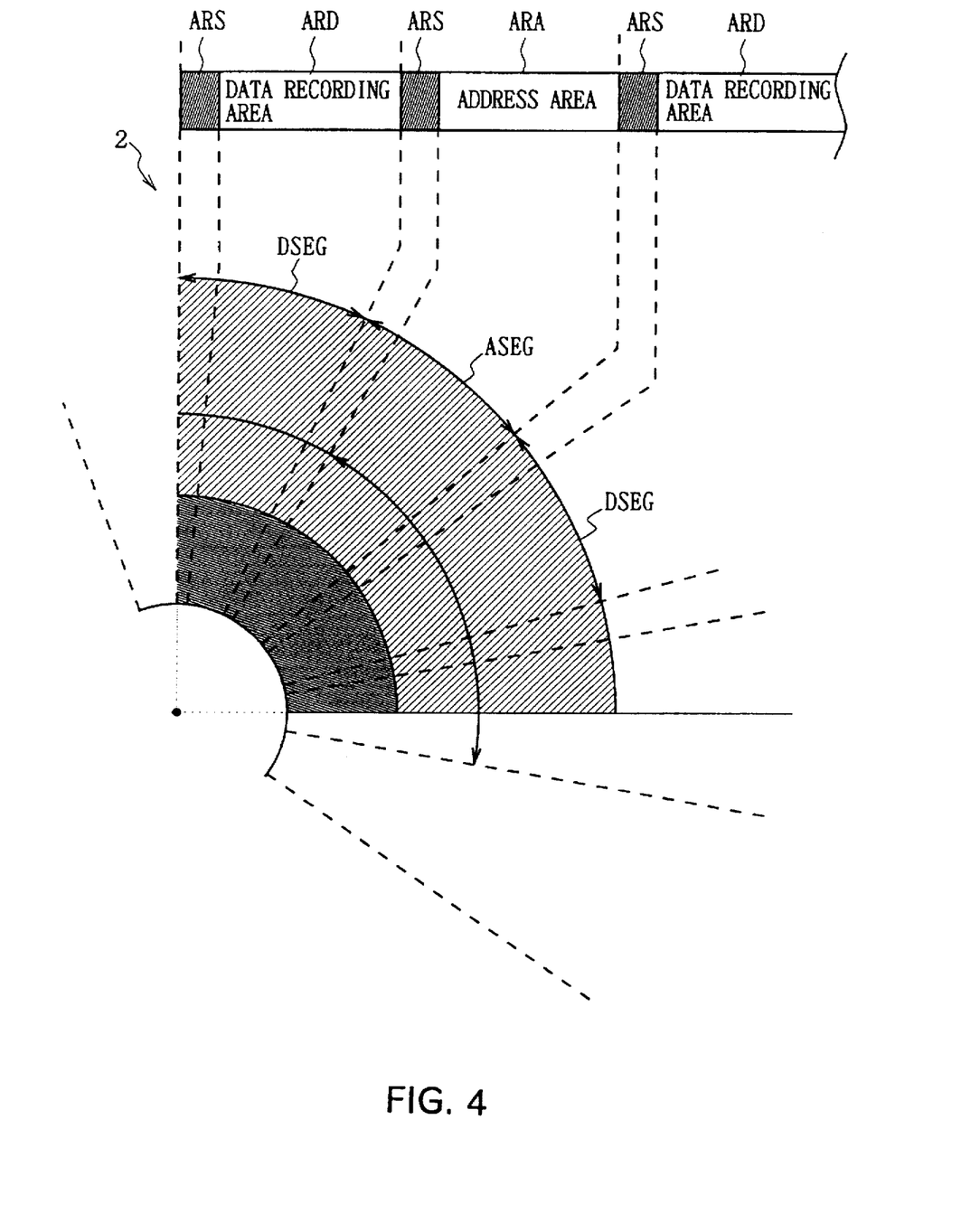

Further, as shown in FIG. 4, in the magneto-optical disc 2, one round of the track is divided into one thousand four hundred parts of segments. These segments are classified into a data segment DSEG and an address segment ASEG. One address segment ASEG exists for every fourteen segments. Therefore, one hundred address segments ASEG exist in one round of the track, thus thirteen data segments DSEG exist between the two consecutive address segments ASEG.

Also, the address segment ASEG is composed of a servo area ARS for twenty four servo clocks and an address area $AR_A$ for one hundred ninety two servo clocks which are data recording impossible areas. The data segment DSEG is composed of the servo area ARS for twenty four servo clocks as the data recording impossible area and a recording area $AR_d$ for one hundred ninety two servo clocks as a data recording possible area.

Therefore, in the magneto-optical disc 2, the data recording possible area which can record data and the data recording impossible area which can not record data are formed along the track direction one after the other.

Figure 5:
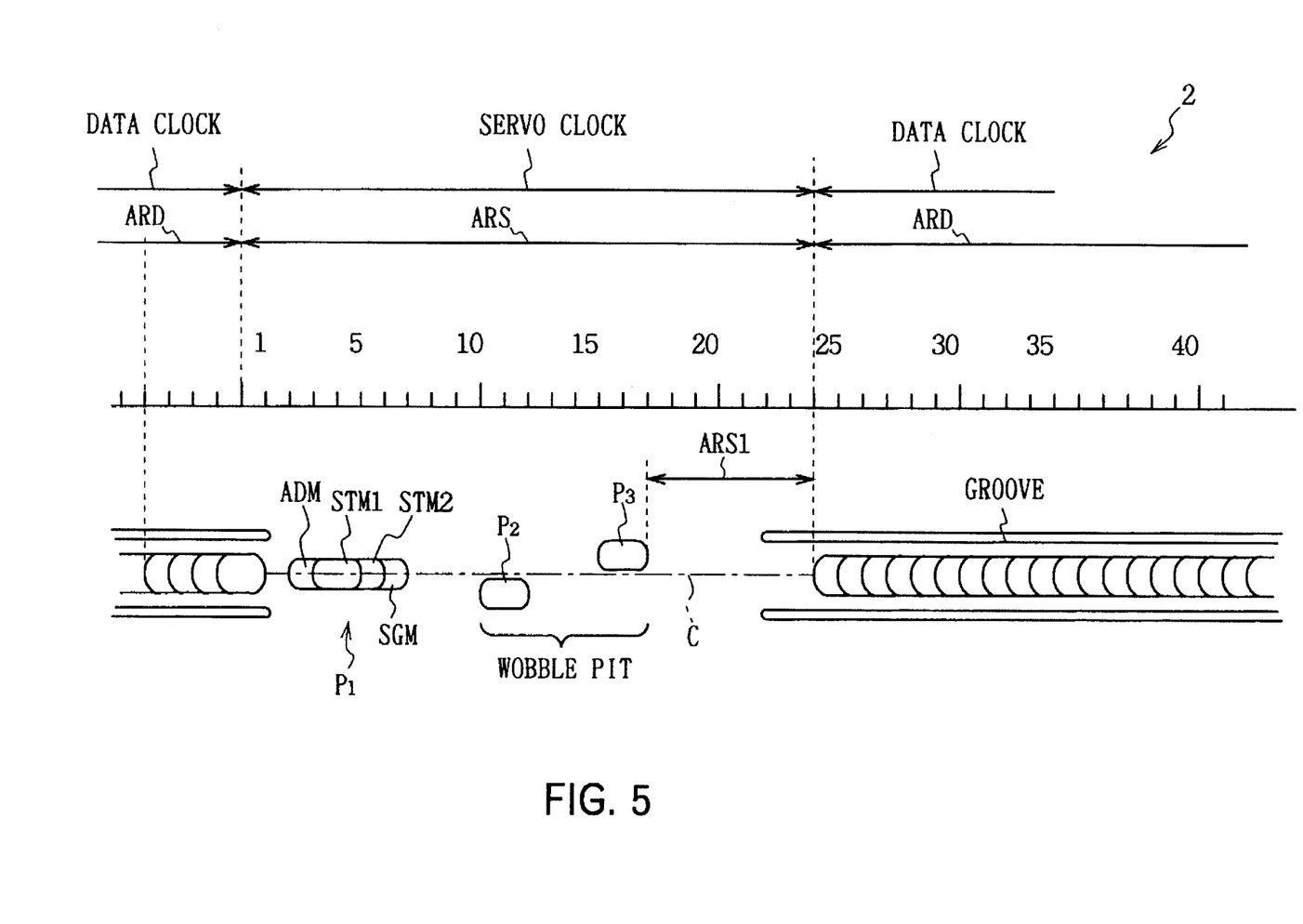

Further, as shown in FIG. 5, in each servo area ARS, a sector mark pit P1, wobble pits P2 and P3 having two servo clock lengths are formed beforehand as an emboss pit which is unable to be deleted. The wobble pits P2 and P3 are respectively formed at the position which shifts by ±¼ in the radial direction of the disc from the center "C" of the track. The differential of the amplitude value is obtained by reproducing an RF signal from the wobble pits P2 and P3, thereby a tracking error signal can be obtained.

Further the sector mark pit P1 formed in the servo area ARS as the emboss pit is classified into an address mark ADM showing that the segment is the address segment ASEG, a first sector mark STM1 showing that the segment is the head segment of the sector, a second sector mark STM2 showing that the next segment is the head segment of the sector, and a segment mark SGM showing the case of other than the above state, in accordance with the position of the sector mark pit P1. The address mark ADM, the first sector mark STM1, the second sector mark STM2, and the segment mark SGM have a length for two servo clocks and are unable to be deleted, respectively.

As shown in FIG. 2, the magneto-optical disc 2 is rotationally driven by a spindle motor 4 controlled by a spindle servo circuit 3, in such a way as to satisfy the prescribed revolving speed. An optical pickup 5 emits, based on a laser power control circuit 6, a laser beam on the surface opposite to the surface where the magnetic film of the magneto-optical disc 2 is formed, in such a way as to emit prescribed intensity of light spot which is required for record or reproduction of the magneto-optical recording medium.

At the time of reproduction, the optical pickup 5 receives the reflected light obtained by emitting the laser beam on the magneto-optical disc 2 with light receiving element, of which the detecting area is divided into plural areas, set in the optical pickup 5, and the output current of the light receiving element is output to a current-voltage (I-V) conversion matrix circuit 7.

After the output current of the light receiving element is converted into the voltage, the I-V conversion matrix circuit 7 generates a focus error signal FE by performing the prescribed calculation to output the focus error signal FE to a servo control circuit 8. The servo control circuit 8 controls the optical pickup 5 on the basis of the focus error signal FE to control a focus for the magneto-optical disc 2.

Further, the I-V conversion matrix circuit 7 performs the prescribed calculation processing and obtains a sum signal in order to obtain a magneto-optical servo signal S1 (hereinafter, referred to as the RF signal) after converting the output current of the light receiving element into the voltage, then outputs the RF signal S1 to a phase locked loop (PPL) circuit 10 through an analog-to-digital (A/D) conversion circuit 9.

Also, the I-V conversion matrix circuit 7 performs the prescribed calculation and obtains the differential signal in order to obtain a magneto-optical signal S2 (hereinafter, referred to as MO signal) after converting the output current of light receiving element into voltage, then outputs the MO signal S2 to a selector 11.

That is, the I-V conversion matrix circuit 7 obtains the RF signal S1 (in the address segment ASEG, an RF signal reproduced from a pit which is formed in the address segment ASEG beforehand is included) reproduced from the wobble pits P2 and P3 (FIG. 5) of the servo area ARS which is formed in the magneto-optical disc 2 with a fixed interval beforehand to obtain the MO signal S2 reproduced from the data recording area ARD, on the basis of the result of light receiving the optical pickup 5.

The PLL circuit 10 generates a servo clock signal S4 from the RF signal S3 converted into a digital signal to output the servo clock signal S4 to the A/D conversion circuit 9 and a timing generator (TG) 12. That is, the PLL 10 converts the RF signal S1 into the digital signal on the basis of the servo clock signal S4. Besides, the PLL circuit 10 generated a data clock signal S5 on the basis of the servo clock signal S4 to output the data clock signal S5 to the timing generator 12, an analog-to-digital (A/D) conversion circuit 13 and a magnetic field driving data generating circuit 14.

More precisely, the PLL circuit 10 generates the data clock signal S5 by frequency-dividing the generated servo clock signal S4 with the frequency dividing ratio which is different for every zone.

The timing generator 12 generates a segment synchronizing signal S6 and an address synchronizing signal S7 on the basis of the servo clock signal S4 and the data clock signal S5, and outputs the segment synchronizing signal S6 and the address synchronizing signal S7 to the selector 11, the magnetic field driving data generating circuit 14 and a data detecting circuit 15.

At this point, the segment synchronizing signal S6 is a pulse signal which is synchronous with a segment having the logical "H" level at the head of all segments (servo area ARS). The address synchronizing signal S7 is a pulse signal which is synchronous with the address segment ASEG having the logical "H" level at the position of the address segment ASEG.

The selector 11 outputs the MO signal S2 to a clamp circuit 16 in the data segment DSEG. After low frequency fluctuation of the MO signal S2 is eliminated to be clamped to the prescribed potential, the clamp circuit 16 outputs it as an MO signal S8 to the analog-to-digital (A/D) conversion circuit 13.

The A/D conversion circuit 13, after converting the MO signal S8 into a digital signal on the basis of the data clock signal S5, outputs it as an MO signal S9 to the data detecting circuit 15.

The data detecting circuit 15 shapes the wave-form of the MO signal S9 by means of, for instance, a digital equalizer, and demodulates the signal S9 through Viterbi decoding having a high detecting ability by time series correlation of the codes to binarize it. Then the binary signal is output as a reproducing data D1 on the basis of the segment synchronizing signal S6 and address synchronizing signal S7.

The selector 11 selects the RF signal S1 as an input in order to output the RF signal S1 to a clamp circuit 16, in the address segment ASEG and the servo area ARS.

The clamp 16 eliminates low frequency fluctuation of the RF signal S1 to clamp to prescribed potential, then outputs the signal S1 as an RF signal S10 to the data detecting circuit 15 and the tracking error signal generating circuit 17 through the A/D conversion circuit 13.

The tracking error signal generating circuit 17 generates a tracking error signal TE on the basis of the RF signal S11, obtained in the servo area ARF, which is converted into a digital signal through the A/D conversion circuit 13, and outputs the tracking error signal TE to a servo control circuit 8. The servo control circuit 8 controls the optical pickup 5 on the basis of the tracking error signal TE to control the tracking.

On the other hand, in the magneto-optical recording/reproducing apparatus 1, at the time of recording data, the I-V conversion matrix circuit 7 obtains the RF signal S1 on the basis of the result of light receiving of the optical pickup 5, and outputs the RF signal S1 to the PLL circuit 10 through the A/D conversion circuit 9.

The PLL circuit 10, in a similar way to the time of reproduction, generates a servo clock signal S4 and a data clock signal S5 on the basis of the RF signal S3 obtained from the servo area ARF, outputs the servo clock signal S4 and the data clock signal S5 to the timing generator 12, outputs the servo clock signal S4 to the A/D conversion circuit 9, and outputs the data clock signal S5 to the A/D conversion circuit 13 and the magnetic field driving data generating circuit 14.

The timing generator 12, in a similar way to the time of reproduction, generates a segment synchronizing signal S6 and an address synchronizing signal S7 on the basis of the servo clock signal S4 and the data clock signal S5, and outputs the segment synchronizing signal S6 and the address synchronizing signal S7 to the selector 11, the magnetic field driving data generating circuit 14, and the data detecting circuit 15.

Further, the timing generator 12 generates a level control signal S1 which is synchronous to the data clock signal S5 on the basis of the segment synchronizing signal S6 and the address synchronizing signal S7, and outputs the level control signal S12 to a laser power control circuit 6.

The laser power control circuit 6 controls a laser diode which is set in the optical pickup 5 on the basis of the level control signal S12, thereby controls the output level of the laser beam thrown from the laser diode.

Figure 6:
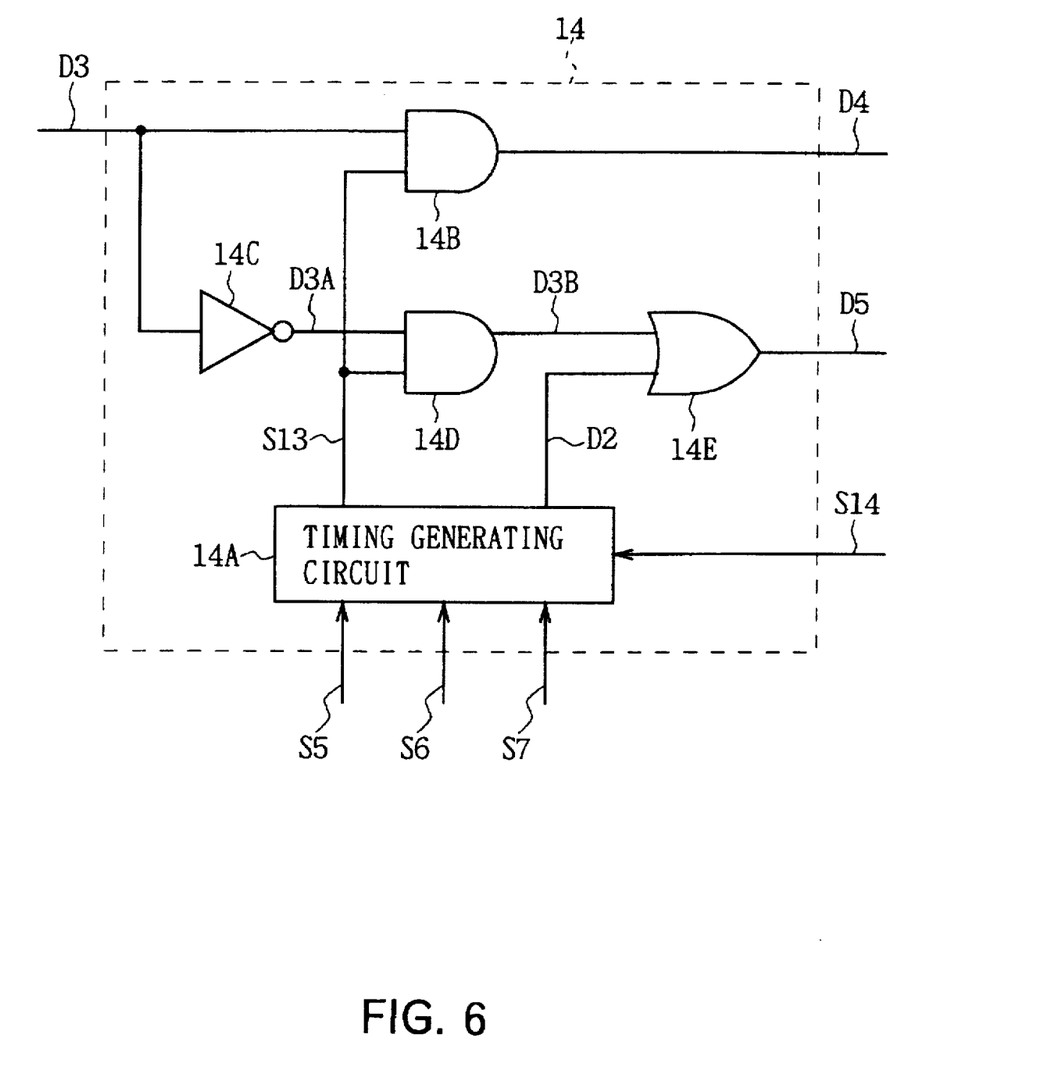
FIG. 6 is a block diagram showing the construction of the magnetic field driving data generating circuit.
Figure 7A:
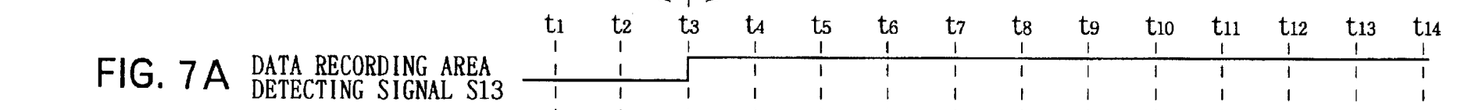

As shown in FIG. 6, in the magnetic field driving data generating circuit 14, the timing generating circuit 14A receives the data clock signal S5, the segment synchronizing signal S6 and the address synchronizing signal S7. The timing generating circuit 14A has a first and a second counters (not shown). When the timing generator circuit 14A receives the segment synchronizing signal S6, the first counter is reset and counts the number of the data clock on the basis of the data clock signal S5. Then a data recording area detecting signal S13 which holds the logical "H" level only in the data recording area ARD is generated based on the counted number of the data clock and the address synchronizing signal S7 (FIG. 7A). That is, the timing generator circuit 14A detects the data recording area ARD in the magneto-optical disc 2 on the basis of the data clock signal S5, the segment synchronizing signal S6 and the address synchronizing signal S7.

Figure 7B:
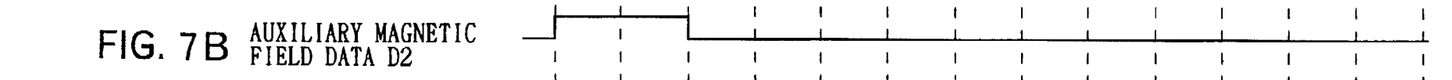

Further, when the timing generating circuit 14A receives the segment synchronizing signal S6, the second counter is reset and counts the number of the data clock. Then in the servo area ARS1 which is positioned between a wobble pit P3 formed at the latest end side of pits for servo information formed in a servo area ARS, and the head of the data recording area ARD located just after the servo area ARS (FIG. 5), an auxiliary magnetic field data D2, which rises to the logical "H" level during the time for two data clocks from the timing prior to the two data clock of the head of the data recording area ARD and then falls to the logical "L" level at the head of the data recording area ARD, is generated (FIG. 7B).

At this point, the angles on the disc corresponding to the period consisting of the same number of the data clock are different from each other because the frequency of the data clock is different at each zone. Therefore, in the case of supplying an auxiliary magnetic field during the time for the same data clocks at each zone, it is necessary to set up so as not to be influenced by the servo pit at the innermost periphery zone.

Also, the timing for rising the auxiliary magnetic field data D2 to the logical "H" level (that is, how many data clocks before the head of the data recording area the auxiliary magnetic field data D2 is risen to the logical "H" level.) can be changed in every zone. In this case, a control unit 18 outputs a clock number switching signal S14 according to each zone to the timing control circuit 14A for each zone, thereby the timing generating circuit 14A changes the timing for rising the auxiliary magnetic field data D2 to the logical "H" level for each zone.

Here, as the aforementioned above, the case where the auxiliary magnetic field data D2 rises to the logical "H" level during the time for two data clocks prior to two data clocks from the head of the data recording area ARD will be described.

In the magnetic field driving data generating circuit 14, a first input terminal of a logical product circuit 14B receives the recording data D3, a second input terminal of the logical product circuit 14B receives the data recording area detecting signal S13 output from the timing generating circuit 14A. The timing of supplying the recording data D3 is controlled by the segment synchronizing signal S6.

Figure 7C:
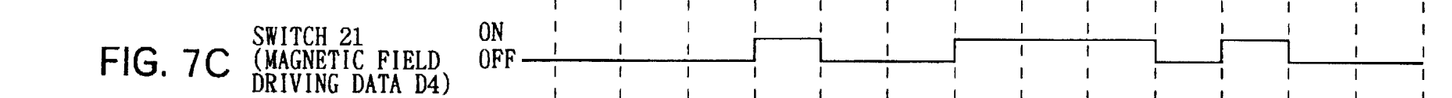
Figure 7D:
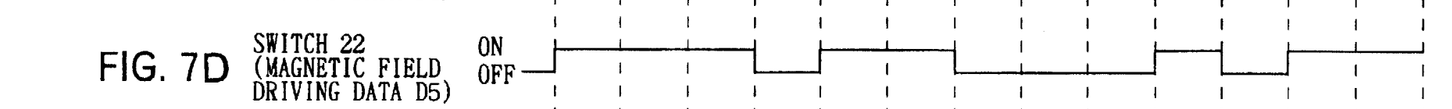
Figure 7E:
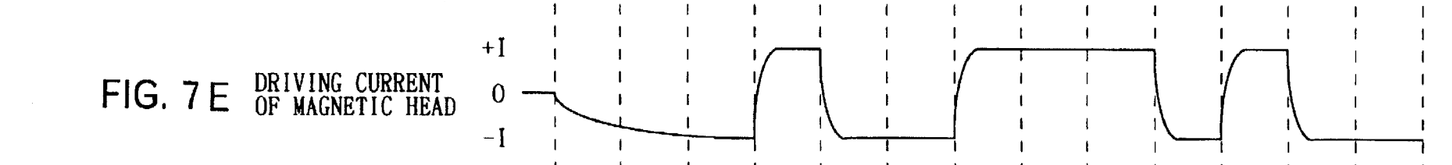
Figure 7F:
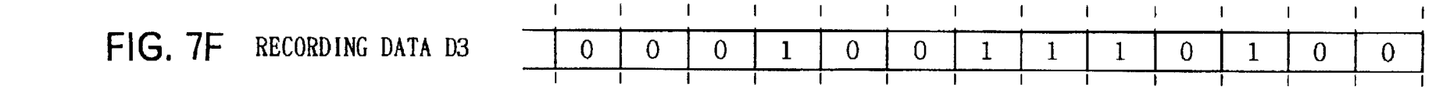
Figure 8:
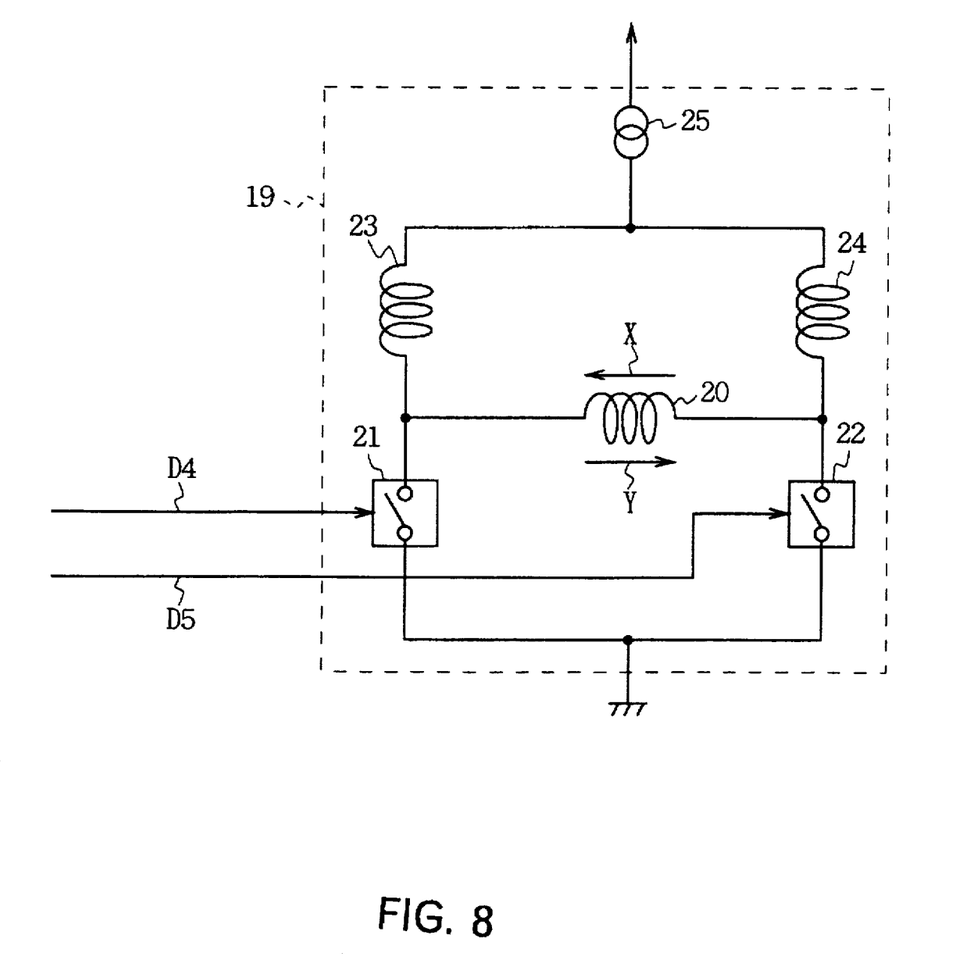
FIG. 8 is a connection diagram showing the construction of the magnetic field head driving circuit.

As shown in FIGS. 7A, 7B and 7F, when the data recording area detecting signal S13 rises to the logical "H" level at the time $t_3$ and the data recording area ARD reaches the position which is an opposite position of a magnetic head 20 of a magnetic head driving circuit 19 (FIG. 8), the logical product circuit 14B generates a magnetic field driving data D4 on the basis of the recording data D3 to supply the data D4 to a switch 21 of the magnetic field head driving circuit 19 (FIG. 8).

Further, in the magnetic field driving data generating circuit 14, the inversion amplification circuit 14C receives the recording data D3, a first input terminal of a logical product circuit 14D receives the recording data D3A inverted by the inversion amplification circuit 14C and a second input terminal of the logical product circuit 14D receives the data recording area detecting signal S13 output from the timing generating circuit 14A.

Therefore, when the data recording area detecting signal S13 rises to the logical "H" level and the data recording area ARD reaches the opposite position of the magnetic head 20 and the recording data D3 becomes to the logical "H" level, the logical product circuit 14D outputs the recording data D3B which falls to the logical "L" level to the logical sum circuit 14E.

As shown in FIGS. 7B, 7D and 7F, when the auxiliary magnetic field data D2 rises to the logical "H" level at the time $t_1$ (the servo area ARS1 prior to two data clocks from the head of the data recording area ARD), the logical sum circuit 14E supplies the magnetic field driving data which rises to the logical "H" level to the switch 22 of the magnetic head driving circuit 19 (FIG. 8).

After that, when the auxiliary magnetic field data D2 falls to the logical "L" level at the time $t_3$, since the recording data D3 is the logical "L" level, the magnetic field driving data D5 is held to the logical "H" level. Sequentially, when the recording data D3 rises to the logical "H" level at the time $t_4$, the logical sum circuit 14E supplies the magnetic field driving data D5 which falls to the logical "L" level to the switch 22 of the magnetic head driving circuit 19.

Accordingly, in the magnetic field driving data generating circuit 14, when the data recording area detecting signal S13 is held to the logical "L" level and the auxiliary magnetic field data D2 is held to the logical "L" level, the magnetic field driving data D4 and D5 to be respectively supplied to the switches 21 and 22 of the magnetic head driving circuit 19 are held to the logical "L" level. When the auxiliary magnetic field data D2 rises to the logical "H" level while the data recording area detecting signal S13 is held to the logical "L" level, the magnetic field driving data D5 rises to the logical "H" level.

Thus, the magnetic field driving data generating circuit 14 can add the auxiliary magnetic field data D2 to the recording data D3 at the timing of scanning the laser beam in the servo area ARS1 which exists between the wobble pit P3 formed at the latest end side of the servo area ARS and the head of the data recording area ARD located just after the servo area ARS, thereby the magnetic field can be generated from the magnetic head 20 in the servo area ARS which exists just before the data recording area ARD.

Figure 7G:
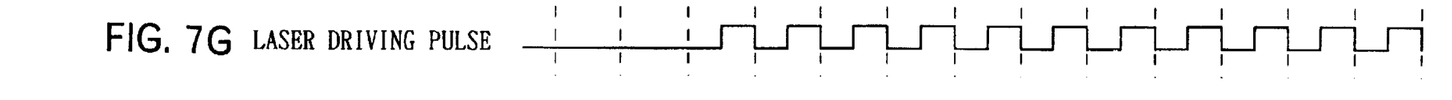

Further, in the magnetic field driving data generating circuit 14, while the data recording area detecting signal S13 is held to the logical "H" level, when the recording data D3 rises to the logical "H" level, the magnetic field driving data D4 rises to the logical "H" level and the magnetic field driving data D5 falls to the logical "L" level. When the recording data D3 falls to the logical "L" level, the magnetic field driving data D4 falls to the logical "L" level and the magnetic field driving data D5 rises to the logical "H" level. Thereby, direction of current which flows through the magnetic field 20 can be changed in accordance with the magnetic field driving data D4 and D5 to modulate the magnetic field. At this time, since the laser beam which is emitted from the laser diode of the optical pickup 5 is regarded as recording level in accordance with the data clock (FIG. 7G), the recording data D3 can be recorded on the magneto-optical disc 2.

Here, the constitution of the magnetic field driving circuit 19 is shown in FIG. 8. The magnetic head driving circuit 19 is composed of: a first auxiliary coil 23 and a second auxiliary coil 24, having inductance which is larger than that of the magnetic head 20, respectively connected to one end and the other end of the magnetic head 20; a first switch 21 connected to one end of the magnetic head 20 and one end of the first auxiliary coil 23; a second switch 22 connected to the other end of the magnetic head 20 and one end of the second auxiliary coil 24; and a constant-current source 25 connected to the other ends of the first and the second auxiliary coils 23 and 24. Further, the switches 21 and 23 are grounded.

Actually, the magnetic head 20 is placed on the extension line of the laser beam emitted from the optical pickup 5, in such a manner that the magneto-optical disc 2 is put between them, and moves together with the optical pickup 5 in the radial direction of the magneto-optical disc 2.

In the magnetic head driving circuit 19, when the switch 21 is set ON based on the magnetic field driving data D4 supplied from the magnetic field driving data generating circuit 14 and the switch 22 is set OFF based on the magnetic field driving data D5, the current "I" flows through the magnetic head 20 in the direction shown by the arrow "X". After that, the switch 21 is turned OFF and the switch 22 is turned ON with a certain timing, the current "I" flows through the magnetic head 20 in the direction shown by the arrow "Y" (FIGS. 7C to 7E). At this time, the direction of the current which flows through the magnetic head 20 can be changed with a speed which is faster than that determined by the time constant of the magnetic head 20.

Thus, in the magneto-optical recording/reproducing apparatus 1, when the recording data D3 is recorded in the data recording area ARD, the magnetic field is not generated during the time of scanning the laser beam from the head of the servo area ARS located just before the data recording area ARD to the wobble pit P3 formed at the latest end side of the servo area ARS, but in the servo area ARS1 which exists between the wobble pit P3 formed at the latest end side of the servo area ARS and the data recording area ARD located just after the servo area ARS, the magnetic field is generated during the time for two data clocks from the timing prior to the two data clocks from the head of the data recording area ARD. In the data recording area ARD, the magnetic field which is modulated based on the recording data D3 can be generated.

According to the above construction, in the magneto-optical recording/reproducing apparatus 1, in the case where the recording data D3 is recorded in the data recording area ARD, the magnetic field driving data D5 rises to the logical "H" level by the magnetic field driving data generating circuit 14 at the time $t_1$ prior to the time for two data clocks from the head of the data recording area ARD. Thereby, since the switch 22 of the magnetic head driving circuit 19 is turned ON, the driving current "−I" flows through the magnetic head 20 in the direction shown by the arrow "Y", thus the magnetic field is generated from the magnetic head 20 in the servo area ARS1.

After that, in the magnetic field driving data generating circuit 14, the magnetic field driving data D4 rises to the logical "H" level and the magnetic field driving data D5 falls to the logical "L" level at the time $t_4$ (in the data recording area ARD). Thereby, the switch 21 of the magnetic head driving circuit 19 is turned ON and the switch 22 is turned OFF, so that the driving current "I" flows through the magnetic head 20 in the direction shown by the arrow "X".

At this time, energy which is required for recording data has been stored in the auxiliary coil 24, so that intensity of the magnetic field for recording data at the time $t_3$ can be surely obtained.

Accordingly, in the magneto-optical recording/reproducing apparatus 1, the magnetic field is generated in the servo area ARS1 which exists between the wobble pit P3 formed at the latest end side of the servo area ARS and the head of the data recording area ARD located just after the servo area ARS. That is, ARS is in the area located just before the data recording area, so that practically sufficient intensity of the magnetic field can be steadily and rapidly obtained at the time of recording recording data D3 in the data recording area ARD.

According to the aforesaid configuration, in the servo area ARS1 which exists between the wobble pit P3 located at the latest end side of the servo area ARS and the head of the data recording area ARD located just after the servo area ARS, the auxiliary magnetic field data D2 corresponding to two data clocks is added at the timing prior to two data clocks from the head of the data recording area ARD, thereby practically sufficient intensity of the magnetic field can be steadily and rapidly obtained at the time of recording the recording data D3 in the data recording area ARD.

Thus the magneto-optical recording/reproducing apparatus 1 which can cope with high-density recording with low power consumption can be realized.

Further, according to the aforesaid configuration, the magnetic field is generated from the magnetic head 20 in the servo area ARS1 which exists between the wobble pit P3 located at the latest end side of the servo area ARS and the head of the data recording area ARD located just after the servo area ARS, thereby it can be previously prevented that the magneto-optical recording apparatus 1 misoperates owing to disturbance of the magnetic field.

In this connection, in the case where the magnetic field is generated at a servo information sampling position such as an emboss pit, disturbance of the magnetic field has a bad influence on circuits, therefore the magneto-optical recording/reproducing apparatus 1 may misoperate. Especially, because the circuits may be bad influenced at the time of reading servo information, in the present invention as the aforementioned above, the magnetic field is generated in the only servo area ARS1 which exists between the wobble pit P3 located at the latest end side of the servo area ARS and the head of the data recording area ARD located just after the servo area ARS, thereby the bad influence can be previously prevented.

Figure 9A:
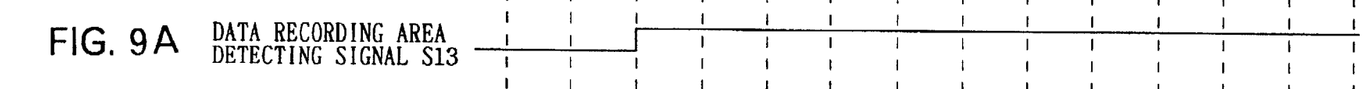
Figure 9B:
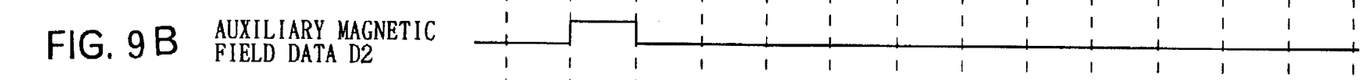
Figures 9C, 9D:
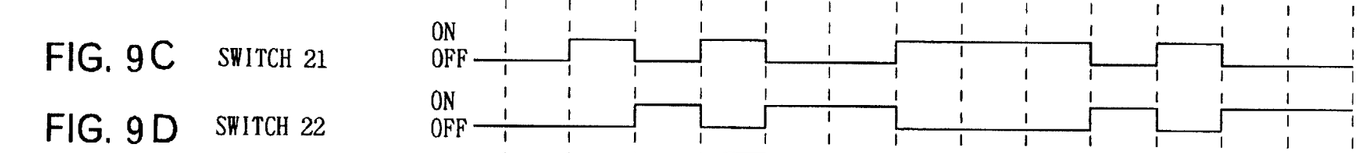
Figure 9E:
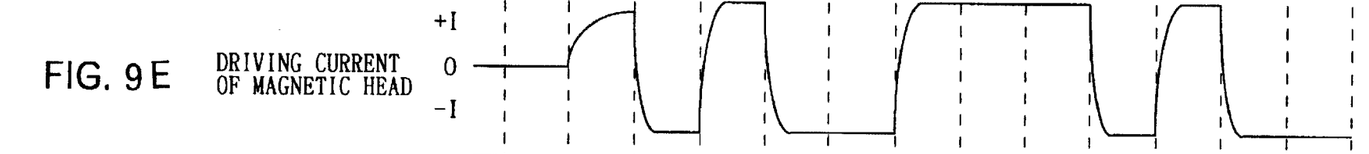
Figure 9F:
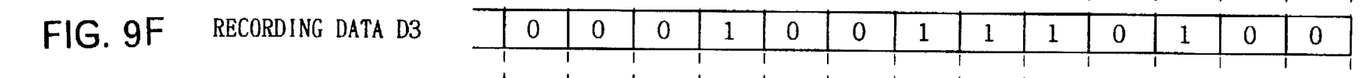
Figure 9G:
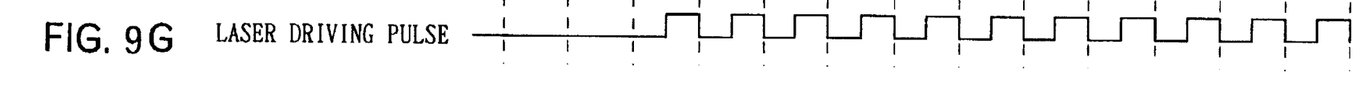

The aforementioned embodiment has dealt with a case where the magnetic field is generated from the magnetic head 20 during the time for two data clocks from the timing prior to the two data clocks from the head of the data recording area ARD. However, this invention is not limited thereto and as shown in FIG. 9, the magnetic field can be generated from the magnetic head 20 during the time for one data clock from the timing prior to one data clock from the data recording area ARD. In short, if the magnetic field is generated in the servo area ARS1, the same advantage as the aforementioned embodiment can be obtained, even if the magnetic field is generated from the magnetic head 20 during the time for various number of data clocks and with various timing as the length of the magnetic field which is generated before recording data (that is, it corresponds to the number of data clock) and the timing of generating the magnetic timing.

Figure 10A:
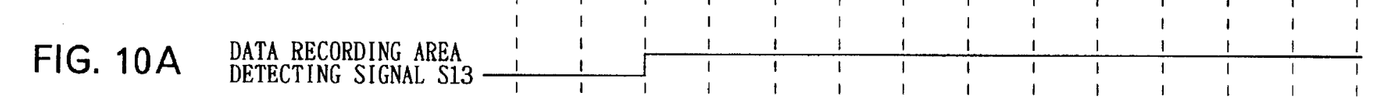
Figure 10B:
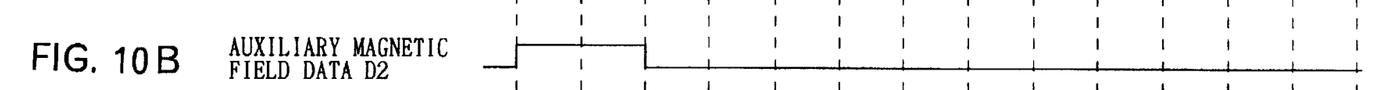
Figure 10C:
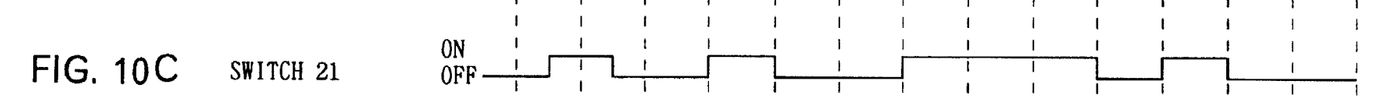
Figures 10D, 10E, 10F:
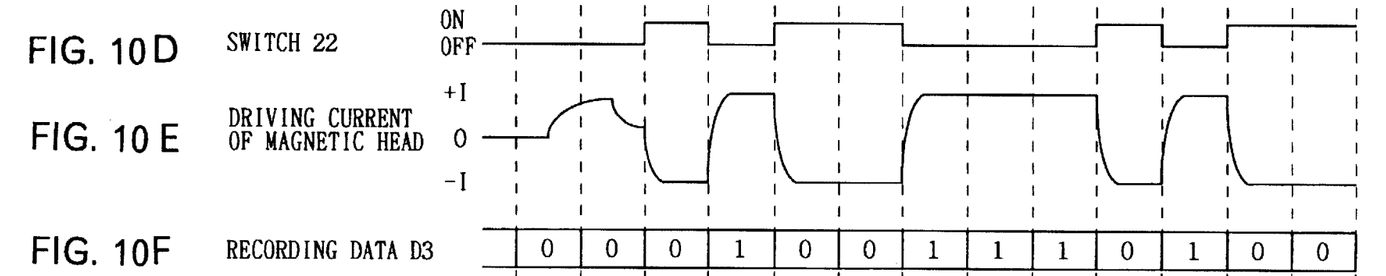
Figure 10G:
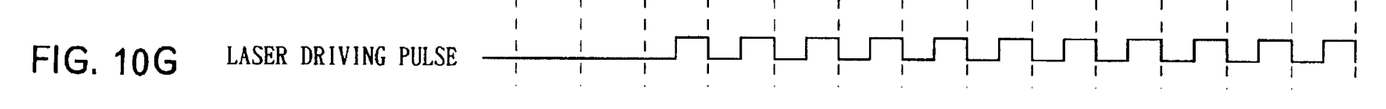

Further, the aforementioned embodiment has dealt with a case where the magnetic field is generated from the magnetic head 22 in the servo area ARS1 by synchronizing to a data clock. However, this invention is not limited thereto and as shown in FIG. 10, if the magnetic field is generated in the servo area ARS1, the magnetic field can be generated from the magnetic head with various timing, without generating the magnetic field by synchronizing to the data clock. In this case, the magnetic field is generated with such a timing that high-speed modulation characteristic of the magnetic field is not spoiled.

Further, the aforementioned embodiment has dealt with a case where the magnetic field corresponding to a recording data "0" is generated in the servo area ARS1 (that is, the auxiliary magnetic field data D2 is supplied to the switch 22 side). However, this invention is not limited thereto and as shown FIGS. 9 and 10, in the case where the magnetic field corresponding to a recording data "1" is generated in the servo area ARS1 (that is, the auxiliary magnetic field data D2 is supplied to the switch 21 side), the same advantage as the aforementioned embodiment can also be obtained.

Furthermore, the aforementioned embodiment has dealt with a case where a magneto-optical disc 2 is used as a magneto-optical recording medium. However, this invention is not limited thereto and it is able to use the other various kinds of magneto-optical recording mediums, such the magneto-optical recording medium as a data recording area which can record data and a data recording impossible area in which at least one pit is formed not to be deleted and data is not able to be recorded are successively formed along a track.

As described above, according to the present invention, in the case where a laser beam is emitted on one surface of a magneto-optical recording medium and a magnetic field is supplied to the other surface of the magneto-optical recording medium corresponding to a position where the laser beam of the magneto-optical recording medium is emitted on to record information data in a data recording area of the magneto-optical recording medium, the magnetic field is not generated during the time of scanning the laser beam from the head of the data recording impossible area located just before the data recording area to the pit formed at the latest end side of the data recording impossible area. Instead the magnetic field is generated in a data recording impossible area which exists between a pit formed at the latest end side of the data recording impossible area and the head of the data recording area located at just after the data recording impossible area. In in the data recording possible area, the magnetic field modulated based on the information data is controlled to be generated, thereby practically sufficient intensity of the magnetic field can be steadily and surely obtained at the time of recording information data in a data recording area.

Thus, a magneto-optical recording apparatus and a magneto-optical recording method which can cope with high-density recording with low power consumption can be realized.

While there has been described in connection with the preferred embodiments of the invention, it will be obvious to those skilled in the art that various changes and modification s may be made, therefore, to cover in the appended claims all such changes and modifications as fall within the true spirit and scope of the invention

What is claimed is:

1. A magneto-optical recording apparatus which records data on a magnetic field modification system in a magneto-optical recording medium in which a recording possible area which is able to record data and a recording impossible area in which at least one pit is formed not to be deleted and data can not be recorded are successively formed along a track, said magneto-optical recording apparatus comprising:

laser means for emitting a laser beam on one surface of said magneto-optical recording medium;

magnetic field generating means for generating a magnetic field which is supplied on the other surface of said magneto-optical recording medium corresponding to a position where said laser beam of said magneto-optical recording medium is emitted; and control means for controlling said magnetic field generating means, when information data is recorded in a certain recording possible area, so as to generate the magnetic field in said recording impossible area which exists between a pit located at the latest end side of said recording impossible area and the head of said certain recording possible area, and controlling said magnetic field generating means so as to generate the magnetic field modulated based on said information data in said certain recording possible area, without generating the magnetic field according to said magnetic field generating means during the time of scanning said laser beam from the head of said recording impossible area located just before said certain recording area to said pit located at the latest end side of said recording impossible area.

2. The magneto-optical recording apparatus according to claim 1, wherein:

said control means comprising:

clock signal generating means for generating a clock signal; and magnetic field driving data output means for adding an auxiliary magnetic field data to said information data with the timing of scanning said laser beam in said recording impossible area which exists between the pit located at the latest end side of said recording impossible area and the head of said certain recording possible area, and for outputting it as magnetic field driving data on the basis of said clock signal, wherein said magnetic field generating means generates the magnetic field on the basis of said magnetic field driving data.

3. The magneto-optical recording apparatus according to claim 2, wherein said laser means emits a laser beam with an output level, possible to record data shown by magnetic field generated by said magnetic field generating means in said magneto-optical recording medium, only in said recording possible area.

4. The magneto-optical recording apparatus according to claim 2, further comprising:

reproducing means for reproducing information recorded in said magneto-optical recording medium on the basis of a laser beam reflected from said magneto-optical recording medium; wherein:

a pit for supplying servo information of sample servo system is formed in said recording impossible area of said magneto-optical recording medium; and said clock signal generating means generates said clock signal based on information from said pit reproduced by said reproducing means.

5. The magneto-optical recording apparatus according to claim 2, wherein:

said magnetic field generating means, comprising:

a magnetic head;

a first coil of which one end is connected to one end of said magnetic head;

a second coil of which one end is connected to the other end of said magnetic head;

first switch means of which one end is connected to one end of said magnetic head and one end of said first coil; and second switch means of which one end is connected to the other end of said magnetic head and one end of said second coil, and wherein said magnetic field driving data output means generates first magnetic field driving data for controlling said first switch means and second magnetic field driving data for controlling said second switch means and adds said auxiliary magnetic field data to either said first magnetic field driving data or said second magnetic driving data.

6. The magneto-optical recording apparatus according to claim 5, wherein said first and second coils have inductance which is larger than that of said magnetic head.

* * * * *